US007018142B2

(12) United States Patent
Cooper

(10) Patent No.: US 7,018,142 B2
(45) Date of Patent: Mar. 28, 2006

(54) POWER TOOL WITH INTEGRAL GRIPPING MEMBER

(75) Inventor: Vincent P. Cooper, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 130 days.

(21) Appl. No.: 10/197,169

(22) Filed: Jul. 16, 2002

(65) Prior Publication Data

US 2004/0013486 A1 Jan. 22, 2004

(51) Int. Cl.
*B23B 45/00* (2006.01)

(52) U.S. Cl. ........................ 408/124; 173/217; 16/421; 16/430; 16/DIG. 19

(58) Field of Classification Search .................. 16/421, 16/431, DIG. 12, DIG. 19, 430; 310/47, 310/50; 406/124, 241 R; 173/217, 170; D8/68

See application file for complete search history.

(56) References Cited

U.S. PATENT DOCUMENTS

| | | | | |
|---|---|---|---|---|
| 2,155,082 | A * | 4/1939 | Decker | 173/217 |
| 2,383,379 | A * | 8/1945 | Forss | 173/217 |
| RE32,747 | E * | 9/1988 | Ullmann et al. | 200/505 |
| 4,837,892 | A * | 6/1989 | Lo | 16/431 |
| D326,400 | S | 5/1992 | Fushiya et al. | D8/68 |
| D339,727 | S | 9/1993 | Kikuchi | D8/68 |
| D345,090 | S | 3/1994 | Okumura | D8/68 |
| 5,640,741 | A * | 6/1997 | Yano | 16/421 |
| 5,810,525 | A | 9/1998 | Ector, Sr. | 408/241 R |
| 5,839,163 | A * | 11/1998 | Hellmann | 16/436 |
| D429,134 | S * | 8/2000 | Schultz et al. | D8/68 |
| D429,983 | S | 8/2000 | Fu-Hui | D8/61 |
| D434,298 | S * | 11/2000 | Izumisawa | D8/68 |
| 6,161,256 | A | 12/2000 | Quiring et al. | 16/431 |
| D437,759 | S | 2/2001 | Breit et al. | D8/68 |
| D440,850 | S | 4/2001 | Ozawa et al. | D8/68 |
| D446,704 | S * | 8/2001 | Shibata et al. | D8/68 |
| 6,308,378 | B1 * | 10/2001 | Mooty et al. | 16/430 |
| 6,461,088 | B1 * | 10/2002 | Potter et al. | 408/124 |
| 6,568,483 | B1 * | 5/2003 | McCallops et al. | 173/169 |
| 6,729,414 | B1 * | 5/2004 | Cooper et al. | 173/217 |
| 6,858,286 | B1 * | 2/2005 | Simm et al. | 428/182 |
| 2002/0096341 | A1 * | 7/2002 | Hagan et al. | 173/170 |

FOREIGN PATENT DOCUMENTS

| | | |
|---|---|---|
| EP | 0 804 985 | 11/1997 |
| JP | 61-209884 | 9/1986 |
| JP | 5-309509 | * 11/1993 |
| WO | 00/64642 | * 11/2000 |
| WO | WO02/058891 | 8/2002 |

* cited by examiner

*Primary Examiner*—Daniel W. Howell
(74) *Attorney, Agent, or Firm*—Harness, Dickey & Pierce, P.L.C.

(57) ABSTRACT

A power tool has a housing with at least one aperture in the housing. A gripping member is positioned with respect to the outer surface of the housing such that the gripping member is contacted by a user when the power tool is used. At least one member is coupled with the gripping member. The at least one member extends through the at least one housing aperture to enable the gripping member to be positioned with respect to the outer surface of the housing.

41 Claims, 3 Drawing Sheets

POWER TOOL WITH INTEGRAL GRIPPING MEMBER

FIELD OF THE INVENTION

The present invention relates to power tools and, more specifically, to power tool housings with integral gripping members.

BACKGROUND OF THE INVENTION

All electric power tools utilize housings which include gripping surfaces. The gripping surface enables the user to manipulate the power tool for its intended purpose. In power tools which have metallic housings, the housing is generally cold, hard or slippery. This feel is uncomfortable to the end user. Thus, metal housings, while having several desired properties, have the shortcomings that they do not provide the user with the intended feel.

The present invention provides the art with an improved power tool housing. The housing includes a gripping surface which provides the user with the desired feel. Preferably, the invention is utilized in a metallic tool housing.

SUMMARY OF THE INVENTION

In accordance with a first aspect of the invention, a tool housing includes at least one member including a wall having an outer surface and defining a hollow cavity. The wall includes at least one aperture passing through the outer surface into the hollow cavity. A gripping member is positioned to be contacted by the user when the user contacts the outer surface of the wall of the housing. At least one securement member is coupled with the gripping member. The securement member extends through the at least one aperture to secure the gripping surface with the outer surface of the housing. Ordinarily, the housing includes a plurality of apertures. The gripping member includes a plurality of discrete bumps providing feel for the user. Also, the gripping member provides a plurality of securement members equal in number to the plurality of apertures. The discrete bumps may extend from the plurality of apertures. In this case, the securement members are coupled with a carrier which is adjacent to the inner surface of the housing wall. Also, the bumps may extend from an outside surface of a base member. Likewise, the plurality of securement members extend from an inner surface of the base member. The base member is positioned on the outer surface of the housing. Here the securement members extend through the housing wall into the cavity. The securement members include locking heads coupled with an inner surface of the housing wall. Preferably, the housing is metallic. The gripping members are polymeric and preferably elastomeric.

In accordance with the second aspect of the invention, a power tool housing comprises a pair of members coupling with one another forming a housing wall. The housing wall defines a cavity. The housing wall has an outer and an inner surface. At least one aperture extends through at least one housing member. A gripping member is positioned to be contacted by the user when the user contacts the outer surface of the wall of the at least one housing member. At least one securement member is coupled with the gripping member. The securement member extends through the at least one aperture to secure the gripping surface.

In accordance with the third aspect of the invention, a power tool comprises a pair of members coupling with one another forming a housing wall. The housing wall defines a cavity. The housing wall has an outer and an inner surface. At least one aperture extends through at least one housing member. A gripping member is positioned to be contacted by the user when the user contacts the outer surface of the wall of the at least one housing member. At least one securement member is coupled with the gripping member. The securement member extends through the at least one aperture to secure the gripping surface to the outer surface of the housing. A motor is positioned in the housing cavity. Also, an output is coupled with the motor and projects from the housing. A power source is coupled with the motor. An activation member is coupled with the motor and the power source to energize and de-energize the power tool.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
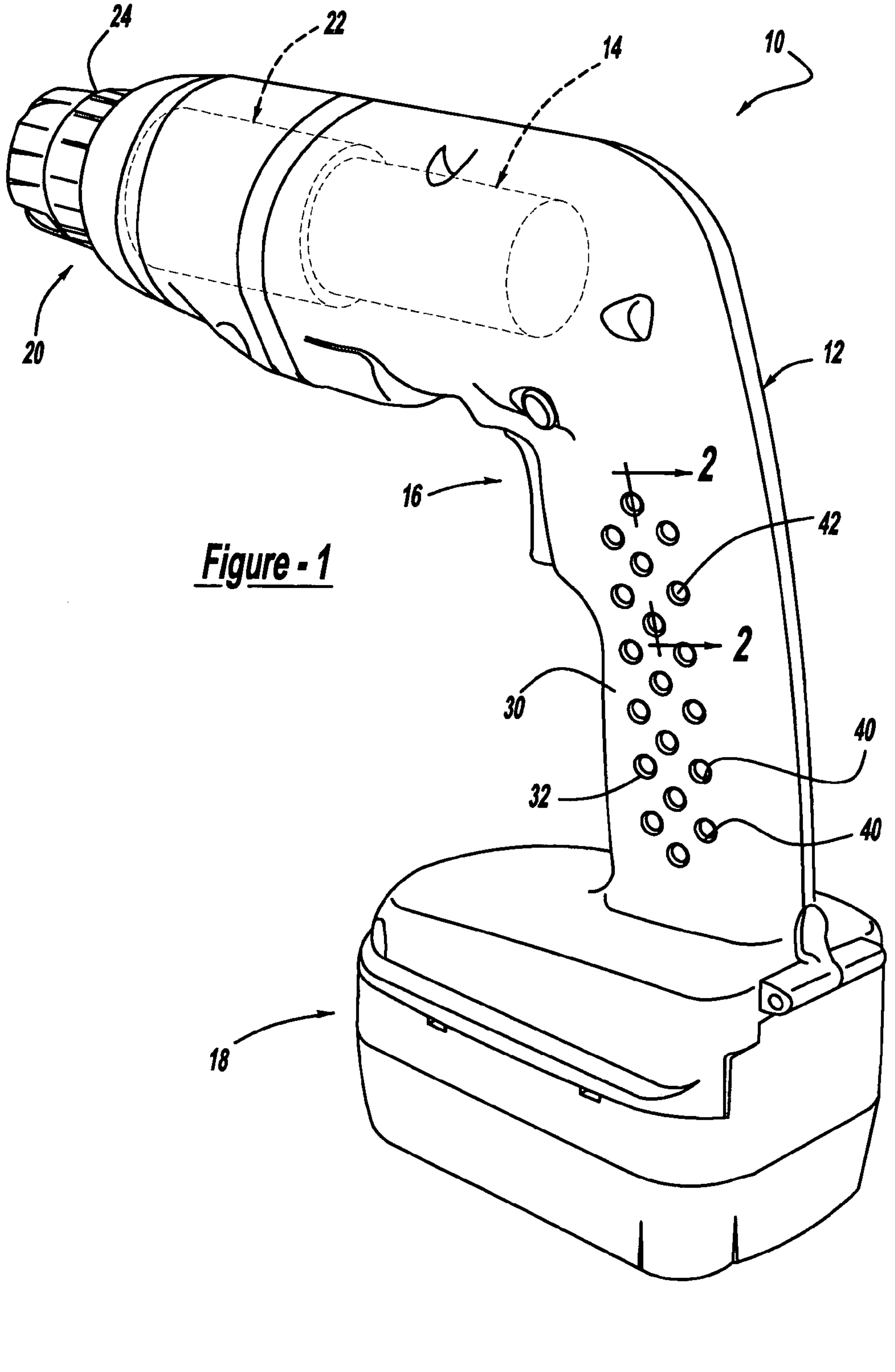
FIG. 1 is a plan view of a power tool in accordance with the present invention.

Turning to FIG. 1, a power tool in accordance with the present invention is illustrated and designated with the reference numeral 10. The power tool 10 is illustrated as a drill; however, any type of power tool such as screwdriver, sander, rotary tool, clippers, saw or the like which utilizes an electric motor and includes a housing may be used with the present invention. The power tool 10 includes a housing 12 which surrounds a motor 14. An activation member 16 is coupled with the motor 14 as well as with the power source 18. The power source 18 may be a battery (DC current) as shown or the power tool may have a power cord (AC current). The motor 14 is coupled with an output 20 which may include a transmission 22 and a chuck 24 to retain a tool (not shown) with the drill.

The housing 12 includes a handle portion 30 which includes a gripping member 32. The gripping member 32 will be described in detail with respect to FIGS. 1 and 2.

As can be seen in FIG. 1, the handle housing includes at least one aperture and preferably, a plurality of apertures each designated with the reference numeral 40. The apertures are arranged in three rows with the middle row offset from the other two rows. The pattern can vary and be of any desired configuration. The gripping member 32 includes a plurality of discrete gripping bumps 42. The gripping bumps 42 project beyond the outer surface of the housing handle to provide the warm textured feel of the polymeric and preferably elastomeric material.

Figure 2:
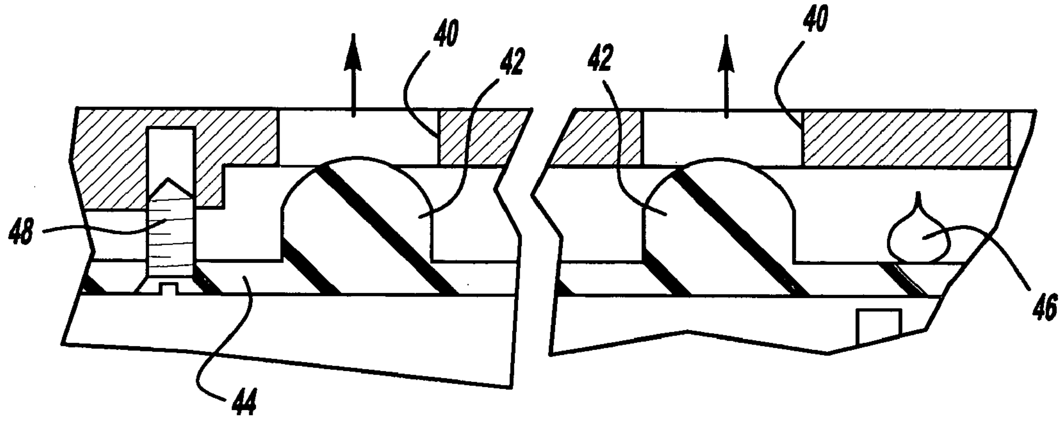
FIG. 2 is a cross-sectional view of FIG. 1 along line 2—2 thereof.

Turning to FIG. 2, the gripping member 32 is illustrated with a carrier member 44. The carrier 44 has the bumps 42 projecting from the carrier 44. As seen, the bumps 42 project through the apertures 40 in the housing 12. The carrier 44 may be the same or a different polymeric material. The carrier 44 is secured to the inner surface of the housing by adhesives 46 (right side of FIG. 2), fasteners 48 (left side of FIG. 2) or the like. Thus, once the carrier 44 is positioned and secured to the inner surface of the housing wall, the bump 42 project through and out of the apertures 40 so that the bumps 42 may be contacted by the user during use of the tool to provide the desired surface feel.

Figure 3:
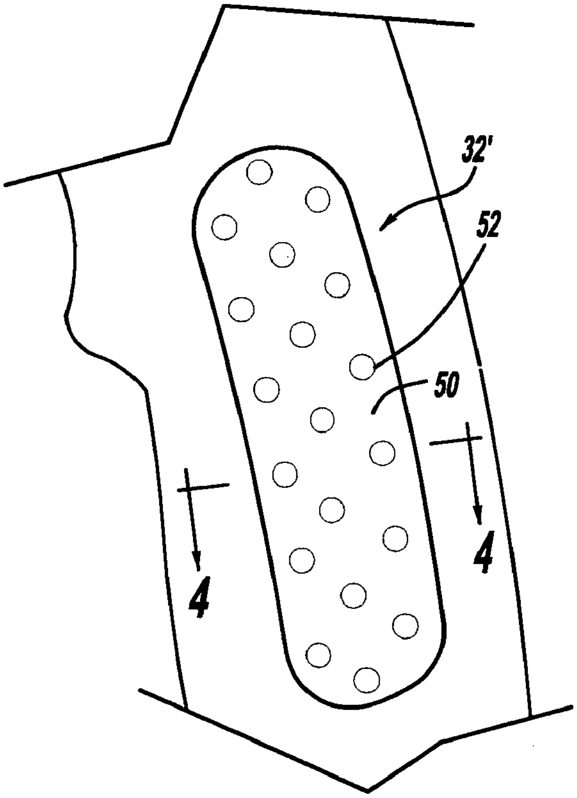
FIG. 3 is a plan view viewed from the outside of a power tool of a second embodiment of the present invention.
Figure 4:
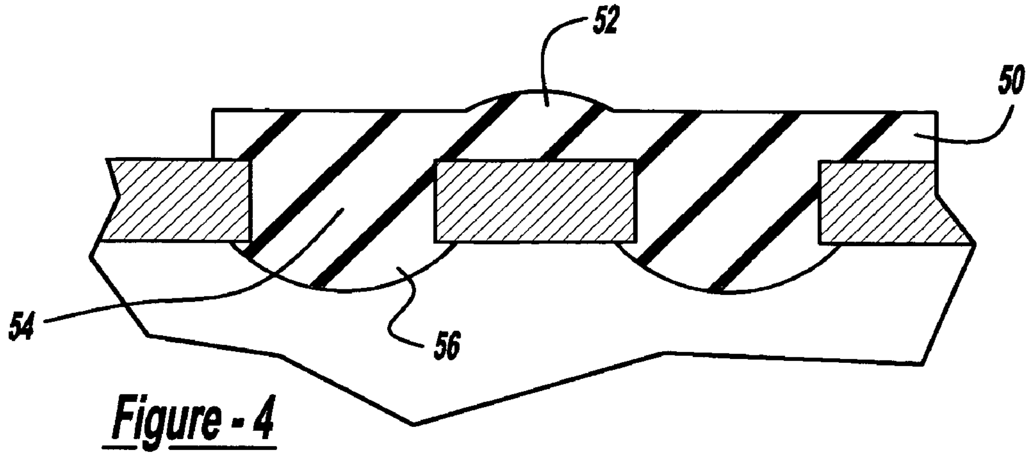
FIG. 4 is a cross-sectional view of FIG. 3 along line 4—4 thereof.

Turning to FIGS. 3 and 4, an additional embodiment is shown. Here, the power tool is the same as that previously described; however, the gripping member 32' varies from that in FIGS. 1 and 2 and will be discussed below.

The gripping member 32' has a desired configuration as shown. Gripping member 32' includes a base 50, bumps 52, and securement members 54. The base 50 has a desired configuration and is rectangularly shaped. The bumps 52 extend from the base 50 and are positioned in a desired configuration. The securement members 54 extend from the side opposite to the bumps 52. The securement members 54 extend into the plurality of apertures 40 in the handle housing portion. Securement members 54 include locking heads 56, which, as seen in FIG. 4, once passing through the apertures 40 provide an undercut blocking feature on the interior surface of the housing wall locking the gripping member 32' in position.

Figure 5:
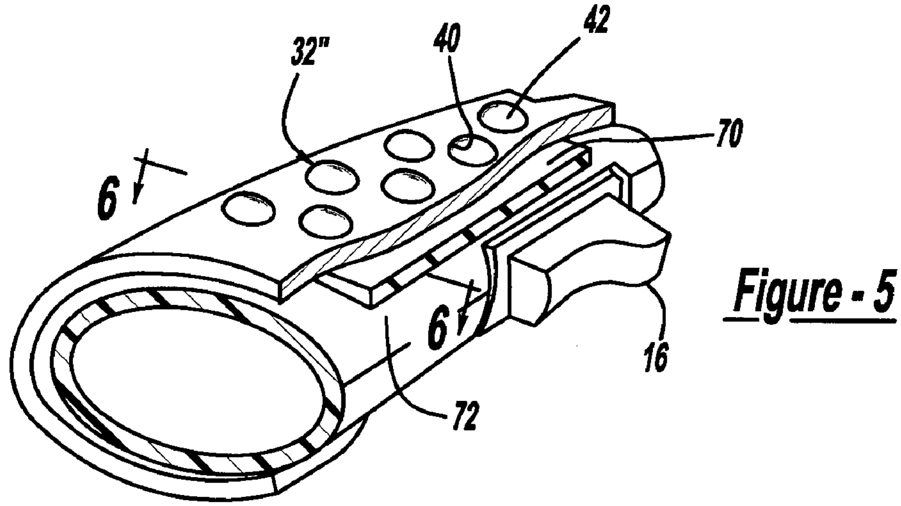
FIG. 5 is a cross-sectional view partially in section of another embodiment of the present invention.
Figure 6:
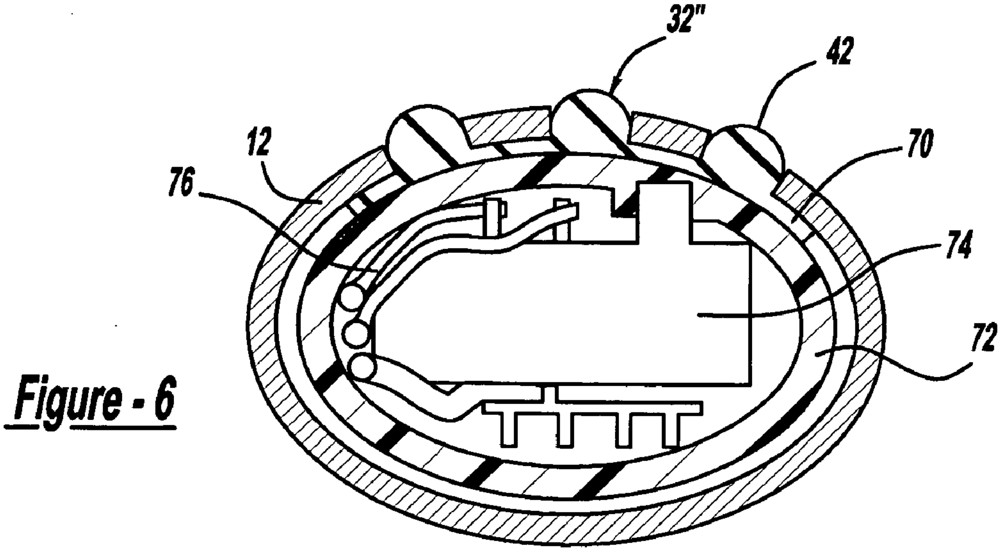
FIG. 6 is a cross-sectional view of FIG. 5 along line 6—6 therefore.

Turning to FIGS. 5 and 6, an additional embodiment is shown. Here the power tool is the same as previously described. The gripping member is like that illustrated in FIGS. 1 and 2.

The gripping member 32" includes a base 70 with extending bumps 42. The bumps 42 extend through the plurality of apertures 40 in the handle portion 30 of the housing 12. The base 70 is sandwiched between the inner surface of the housing and an insulative sub-housing or chassis 72. The base 70 can be frictionally secured in position by the stems of the bumps 42, glued to or molded onto the chassis 72. This mounts the base 70 on the sub-housing in position to extend the bumps 42 into the apertures 40 as seen in FIG. 6. Also, the chassis 72, which may be one or two parts, surround the activation member 16 and in turn the switch 74. The switch 74 includes wires 76 which are electrically coupled with the switch 74.

The sub-housing 72 or chassis is preferably a polymeric or plastic material providing an insulation layer between the metal housing 12 and the switch 74. Thus, the plastic housing provides the required insulation between the electrical switch or components and the metal housing. Also, the sub-housing 72 retains the base in position enabling the grip members 32" to extend through the apertures. Thus, the sub-housing or chassis 72 provide a mounting surface for the base of the gripping member 32" while also providing a housing for the electrical switch which, in turn, insulates the electric switch from the metal housing.

As mentioned above, the gripping member provides a soft and warm feel for the user when a metal housing is used. Thus, the cold, hard, slippery feel of the metal is not experienced by the user. Thus, the gripping surface provides a comfortable feel during use of the power tool.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tool housing comprising:

at least one member including a wall having an outer surface and defining a hollow cavity, said wall including at least one aperture passing through said outer surface into said hollow cavity;

a gripping member, said gripping member positioned with respect to the outer surface of said wall of said housing such that a user contacts said gripping member when using the tool; and at least one member coupled with said gripping member, said member extending through said aperture for enabling said gripping member to be secured in position with respect to said outer surface of said housing; and a plurality of gripping surfaces on said gripping member, said gripping surfaces being contacted by a user during use to provide a desired feel; and said tool housing being metal.

2. The tool housing according to claim 1, wherein said housing member includes a plurality of apertures.

3. The tool housing according to claim 2, wherein said gripping member includes a plurality of discrete members in said plurality of apertures.

4. The tool housing according to claim 3, wherein said plurality of discrete members extend from said plurality of apertures.

5. The tool housing according to claim 4, wherein said plurality of members are coupled with a base, said base secured to an inner surface of said wall.

6. The tool housing according to claim 4 wherein said plurality of members are coupled with a base, said base in contact with a sub-housing inside said cavity.

7. The tool housing according to claim 4 wherein said plurality of members are coupled with a base, said members frictionally engage said apertures securing said gripping member in said housing.

8. The tool housing according to claim 3, wherein said plurality of gripping surfaces are a plurality of bumps extend from an outside surface of a base and said plurality of securement members extend from an inner surface of said base, said base positioned on said outer surface of said housing.

9. The tool housing according to claim 8, wherein said plurality of securement members extend through said housing wall into said cavity.

10. The tool housing according to claim 9, wherein said members including locking heads coupling with an inner surface of said housing wall.

11. A power tool comprising a pair of members coupling with one another forming a housing wall and defining a cavity;

said housing wall having an outer and inner surface;

at least one aperture extending through at least one housing member; and a gripping member, said gripping member positioned with respect to the outer surface of said wall of said housing such that said gripping member is contacted by a user when using the power tool; and at least one member coupled with said gripping member, said member extending through said aperture for enabling said gripping member to be positioned with respect to said outer surface of said housing;

a motor positioned in said housing cavity;

an output coupled with said motor and projecting from said housing;

a power source coupled with said motor; and an activation member coupled with said motor and said power source for energizing and de-energizing said power tool.

12. The tool housing according to claim 1, wherein said gripping member being polymeric.

13. The tool housing according to claim 12, wherein said gripping members being elastomeric.

14. The tool housing according to claim 6 wherein said sub housing surrounds a switch providing electrical insulation.

15. A power tool housing comprising:

a pair of members coupling with one another forming a housing wall and defining a cavity;

said housing wall having an outer and inner surface;

at least one aperture extending through at least one housing member;

a gripping member, said gripping member positioned with respect to the outer surface of said wall of said housing such that said gripping member is contacted by a user when the power tool is used; and at least one member coupled with said gripping member, said member extending through said aperture enabling said gripping member to be positioned with respect to said outer surface of said housing.

16. The power tool according to claim 15, wherein said housing member includes a plurality of apertures.

17. The power tool according to claim 16, wherein said gripping member includes a plurality of discrete members in said plurality of apertures.

18. The power tool according to claim 17, wherein said plurality of discrete members extend from said plurality of apertures.

19. The power tool according to claim 18 wherein said plurality of members are coupled with a base, said base secured to an inner surface of said wall.

20. The power tool according to claim 18 wherein said plurality of members are coupled with a base, said base in contact with a sub-housing inside said cavity.

21. The power tool according to claim 18 wherein said plurality of members are coupled with a base, said members frictionally engage said aperture securing said gripping member in said housing.

22. The power tool housing according to claim 17 wherein a plurality of bumps extend from an outside surface of a base and said plurality of members extend from an inner surface of said base, said base positioned on said outer surface of said housing.

23. The tool housing according to claim 22 wherein said plurality of members extend through said housing wall into said cavity.

24. The tool housing according to claim 23 wherein said members including locking heads coupling with an inner surface of said housing wall.

25. The tool housing according to claim 15 wherein said housing is metal.

26. The tool housing according to claim 15 wherein said gripping member being polymeric.

27. The tool housing according to claim 26 wherein said gripping members being elastomeric.

28. The tool housing according to claim 20 wherein said sub housing surrounds a switch providing electrical insulation.

29. The tool housing according to claim 11 wherein said gripping member being polymeric.

30. The power tool according to claim 11 wherein said housing member includes a plurality of apertures.

31. The power tool according to claim 30 wherein said gripping member includes a plurality of discrete members in said plurality of apertures.

32. The power tool according to claim 31 wherein said plurality of discrete members extend from said plurality of apertures.

33. The power tool according to claim 32 wherein said plurality of members are coupled with a base, said base secured to an inner surface of said wall.

34. The power tool according to claim 32 wherein said plurality of members are coupled with a base, said base in contact with a sub-housing inside said cavity.

35. The power tool according to claim 32 wherein said plurality of members are coupled with a base, said members frictionally engage said aperture securing said gripping member in said housing.

36. The tool housing according to claim 31 wherein a plurality of bumps extend from an outside surface of a base and said plurality of members extend from an inner surface of said base, said base positioned on said outer surface of said housing.

37. The tool housing according to claim 36 wherein said plurality of members extend through said housing wall into said cavity.

38. The tool housing according to claim 37 wherein said members including locking heads coupling with an inner surface of said housing wall.

39. The tool housing according to claim 11 wherein said housing is metal.

40. The tool housing according to claim 29 wherein said gripping members being elastomeric.

41. The tool housing according to claim 34 wherein said sub-housing surrounds a switch providing electrical insulation.

* * * * *